United States Patent
Ruan

(10) Patent No.: US 12,452,076 B2
(45) Date of Patent: Oct. 21, 2025

(54) AUTHENTICATION SYSTEM HAVING PIPELINED PROCESSING

(71) Applicant: XILINX, INC., San Jose, CA (US)

(72) Inventor: Ming Ruan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 235 days.

(21) Appl. No.: 18/104,735

(22) Filed: Feb. 1, 2023

(65) Prior Publication Data
US 2024/0259210 A1   Aug. 1, 2024

(51) Int. Cl.
| | |
|---|---|
| G06F 21/30 | (2013.01) |
| H04L 9/32 | (2006.01) |
| H04L 9/40 | (2022.01) |
| G06F 21/44 | (2013.01) |
| G06F 21/62 | (2013.01) |
| H04L 9/16 | (2006.01) |

(52) U.S. Cl.
CPC ........ H04L 9/3242 (2013.01); H04L 63/0853 (2013.01)

(58) Field of Classification Search
None
See application file for complete search history.

(56) References Cited

U.S. PATENT DOCUMENTS

| | | | |
|---|---|---|---|
| 2006/0026442 A1* | 2/2006 | Ittogi | H04L 9/0643 713/168 |
| 2012/0057702 A1* | 3/2012 | Minematsu | H04L 9/3242 380/255 |
| 2019/0068368 A1* | 2/2019 | Moriyama | H04L 9/0894 |

OTHER PUBLICATIONS

Advanced Encryption Standard with Galois Counter Mode using Field Programmable Gate Array. Ahmad. IOP. (Year: 2017).*
Analysis and Optimization of Galois/Counter Mode (GCM) using MPI. Durand. IEEE. (Year: 2015).*
Performance Comparison of AES-GCM-SIV and AES-GCM Algorithms for Authenticated Encryption on FPGA Platforms. Koteshwara. IEEE. (Year: 2017).*
Dworkin, M. "Recommendation for block cipher modes of operation: Galois/counter mode (GCM) and GMAC," NIST Special Publication 800-38D, National Institute of Standards and Technology (NIST), Nov. 2007.

(Continued)

*Primary Examiner* — Venkat Perungavoor
(74) *Attorney, Agent, or Firm* — Patterson + Sheridan, LLP

(57) ABSTRACT

An authentication device for a communication device includes key stream generator circuitry and hash function circuitry. The key stream generator circuitry receives a first input data stream and generates a first data stream output signal based on the first input data stream and an encryption key. The first input data stream is associated with a first data rate. The hash function circuitry receives the first data stream output signal from the key stream generator circuitry. The hash function circuitry includes first decimation circuitry and recursive circuitry. The first decimation circuitry receives the first data stream output signal, and combines adjacent data words of the first data stream output signal to generate a first decimated output signal having a second data rate. The second data rate is less than the first data rate. The recursive circuitry generates an authentication tag based on the first decimated output signal.

17 Claims, 4 Drawing Sheets

(56) References Cited

OTHER PUBLICATIONS

Bahadori, M., et al. "FPGA Implementations of 256-Bit SNOW Stream Ciphers for Postquantum Mobile Security," in IEEE Transactions on Very Large Scale Integration (VLSI) Systems, vol. 29, No. 11, pp. 1943-1954, Nov. 2021.
Satoh, A., et al. "High-performance hardware architectures for Galois counter mode," IEEE Transactions on Computers, vol. 58, No. 7, pp. 917-930, 2008.

* cited by examiner

AUTHENTICATION SYSTEM HAVING PIPELINED PROCESSING

TECHNICAL FIELD

Examples of the present disclosure generally relate to authentication systems for communication systems, and, more particularly, to authentication systems employing pipelined processing of data streams.

BACKGROUND

Communication systems (and other electronic systems) employ authentication systems to provide efficient and reliable data transmission. The authentication systems use various cryptography processes used in the encryption and/or decryption of a received data stream. An example cryptography process is a Galois/Counter Mode (GCM) process. A GCM process combines a counter mode of encryption with a Galois mode of authentication. In various instances in a GCM process, parallel computation of the Galois field multiplication is used for authentication to increase the throughput of the authentication system. A GCM process uses various addition operation functions, multiplication operation functions, and exponential operation functions to generate an authentication tag for a corresponding input data stream.

SUMMARY

In one example, an authentication device includes key stream generator circuitry and hash function circuitry. The key stream generator circuitry receives a first input data stream and generates a first data stream output signal based on the first input data stream and an encryption key. The first input data stream is associated with a first data rate. The hash function circuitry receives the first data stream output signal from the key stream generator circuitry. The hash function circuitry includes first decimation circuitry and recursive circuitry. The first decimation circuitry receives the first data stream output signal, and combines adjacent data words of the first data stream output signal to generate a first decimated output signal having a second data rate. The second data rate is less than the first data rate. The recursive circuitry generates an authentication tag based on the first decimated output signal.

In one example, hash function circuitry includes first decimation circuitry and recursive circuitry. The first decimation circuitry receives a first data stream output signal, and combines adjacent data words of the first data stream output signal to generate a first decimated output signal having a first data rate. The first data stream output signal is generated from a first input data stream and an encryption key. The first input data stream has a second data rate that is greater than the first data rate. The recursive circuitry configured to generate an authentication tag based on the first decimated output signal.

In one example, a method includes receiving a first input data stream and generating a first data stream output signal based on the first input data stream and an encryption key. The first input data stream is associated with a first data rate. The method further includes generating, via first decimation circuitry of hash function circuitry, a first decimated output signal by combining adjacent data words of the first data stream output signal. The first decimated output signal has a second data rate. The second data rate is less than the first data rate. Further, the method includes generating, via recursive circuitry of the hash function circuitry, an authentication tag based on the first decimated output signal.

BRIEF DESCRIPTION OF DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
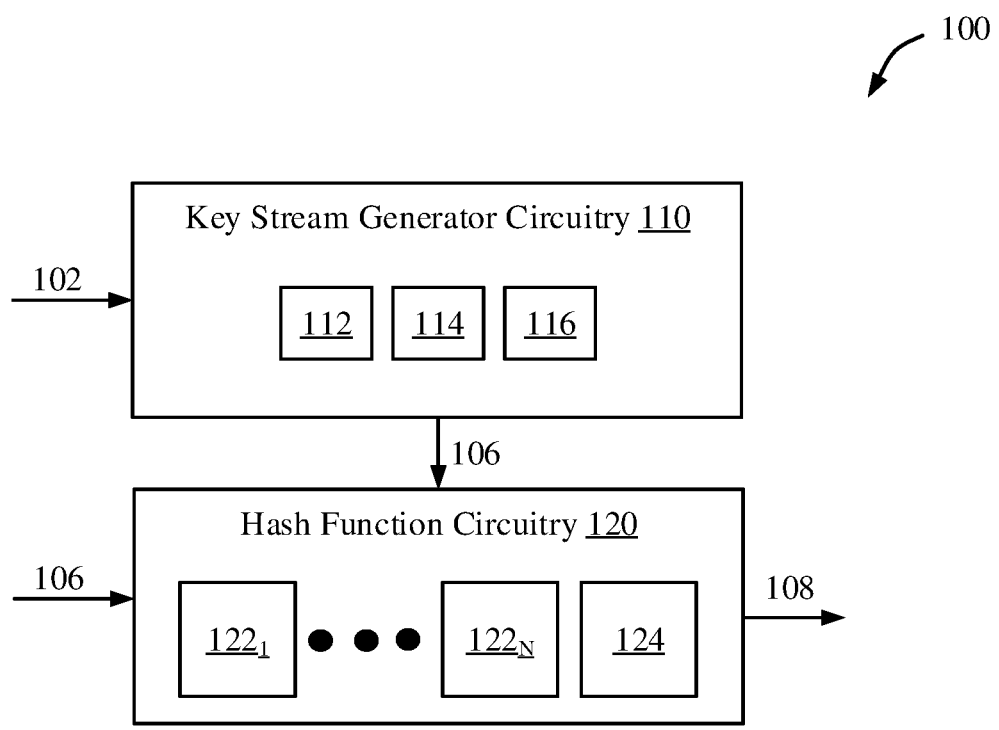
FIG. 1 is a block diagram of an authentication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Authentication systems within communication systems use cryptography processes for reliable data transmission between devices of the communication system. In one example, a communication system includes one or more interconnected substations that are connected to various other computing devices. The substations receive data streams from computing devices. A substation uses an authentication system to authenticate and encrypt and/or decrypt the received data stream.

An authentication system employs a cryptography process during the authentication process of transmitted and/or received data. An example cryptography process is a Galois/Counter Mode (GCM) process. A GCM process combines a counter mode of encryption with a Galois mode of authentication. As will be described in greater detail in the following, a GCM process uses various addition functions, multiplication operation, and/or exponential functions to generate an authentication tag for a corresponding input data stream.

The addition functions, multiplication functions, and exponential functions of a GCM process may be performed using combinational logic. However, the size of the combinational logic is large, increasing the manufacturing costs of the corresponding authentication system. Further, the combinational logic uses a high-number of inputs for highly complicated operations that limit the maximum achievable clock frequency. In various instances, a GCM process employs a recursive processing format to reduce the number of multiplications performed. However, in a recursive processing format, a multiplication process receives data from a previous multiplication process, reducing the corresponding throughput. In a GCM process that employs a recursive processing format, the throughput is inversely proportional to the corresponding latency. Further, in a GCM process that employs a recursive processing format, pipelining within the multiplication processes further reduces the corresponding throughput. Additionally, the processing resource and time overhead of a GCM process that employs a recursive processing format further reduces the throughput of the corresponding authentication system.

As is described in more detail in the following, a GCM process for an authentication system includes decimation circuitries (or decimation stages) followed by a recursive circuitry to increase the throughput of the corresponding GCM process and to allow for pipelining processing of data streams (e.g., data packets). The decimation circuitries are serially concatenated to each other, with the output of the last decimation circuitry being coupled to the input of the recursive circuitry. Each decimation circuitry reduces the sampling rate of an input data stream (e.g., data packet), such that the recursive circuitry is able to use a pipelined multiplication circuitry without negatively affecting the throughput of the corresponding authentication system. Further, the decimation circuitries are able to receive and process input data streams in a pipelined scheme. Accordingly, the GCM process as described herein has an increased throughput, and is able to pipeline the processing of data streams, increasing the number of data streams that are able to be processed. Accordingly, the efficiency of the corresponding authentication system is improved, allowing for a larger number of data streams to be processed in a shorter period of time and/or with a reduced amount of processor resources.

FIG. 1 illustrates a block diagram of authentication device 100, according to one or more examples. The authentication device 100 includes key stream generator circuitry 110 and hash function circuitry 120. The authentication device 100 is a GCM authentication device. In one or more examples, the key stream generator circuitry 110 and the hash function circuitry 120 perform an authentication encryption process. In other examples, the key stream generator circuitry 110 and the hash function circuitry 120 perform an authentication decryption process. The key stream generator circuitry 110 receives input data 102. In one example, the input data 102 includes an input data stream (e.g., data packet). In one or more examples, the input data 102 includes a key (K), an initialization vector (IV) data, and plaintext data.

The key is used by the encryption (e.g., an encryption key) or decryption (e.g., decryption key) process of the key stream generator circuitry 110 to generate encrypted or decrypted data from the plaintext. The initialization vector data has a number of bits between 1 and 256. In other examples, the number of bits of the initialization vector data is greater than 256. In one example, for a fixed value of the key, each initialization vector is distinct and has equal lengths. The plaintext data has a number of bits between 0 and $2^{67}$. The plaintext data is the unencrypted information used as input to the encryption process of the authentication encryption process.

The key stream generator circuitry 110 outputs the output (e.g., output data) 104. In one example, the output data 104 is ciphertext data. The ciphertext data is generated from the key, the initialization vector data, and the plaintext data. The length of the ciphertext data is equal to that of the plaintext data.

The key stream generator circuitry 110 includes counter circuitry 112, encryption circuitry 114, and combination circuitry 116. In one example, the counter circuitry 112 receives the initialization vector data. The counter circuitry 112 performs an increment function to output one or more successive counter values that are output to the encryption circuitry 114. The encryption circuitry 114 encrypts a respective counter value. For example, the encryption function is an advanced encryption standard (AES) function, or another encryption function. In one example, each counter value is encrypted independent from each other. The encrypted data is combined with the plaintext by the combination circuitry 116 to generate ciphertext. In one example, the combination circuitry 116 XORs each encrypted data output with respective bits of the plaintext data to generate a respective ciphertext.

The hash function circuitry 120 receives the output data 104 from the key stream generator circuitry 110 and the input data 106. In one example, input data 106 includes authenticated data. The authenticated data is authenticated and non-encrypted data. The authenticated data has a number of bits between 0 and 256. In one or more examples, the authenticated data is a bit string. The hash function circuitry 120 includes decimation circuitry 122 and recursive circuitry 124. The decimation circuitry 122 includes one or more decimation circuitries (e.g., decimation stages) $122_1$-$122_N$. N is one or more.

The hash function circuitry 120 receives the output data 104 and the input data 106 and generates tag data (e.g., an authentication tag) 108. In one example, the tag is an authentication tag that can be used to verify the integrity of data of an input data stream or data packet (e.g., the plaintext data).

In one or more example, decimation circuitries 122 are pipelined via a serial connection. For example, the output of one decimation circuitry 122 (e.g., the decimation circuitry $122_1$) is the input to a subsequent decimation circuitry 122 (e.g., the decimation circuitry $122_2$). The output of the last decimation circuitry 122 (e.g., the decimation circuitry $122_N$) is the input to the recursive circuitry 124.

Each decimation circuitry 122 reduces the sample rate of the input data stream by half. After K stages of decimation, the sample rate of the input data stream is $\frac{1}{2}^k$ of the input data stream. Reducing the sample rate of the data stream allows for the data stream to be recursively processed by the recursive circuitry 124. The recursive circuitry 124 may include a fully pipelined multiplication function as the sample rate of the input data stream has been reduced, improving the throughput of the corresponding authentication system. A decimation circuitry 122 receives a multiplication parameter h, and one or more data words (e.g., a data stream). Further, the decimation circuitry 122 receives the key. Each decimation circuitry $122_1$-$122_N$ reduces the throughput (e.g., the number of samples) by about half. In other examples, each of the decimation circuitry $122_1$-$122_N$ may reduce the throughput by other amounts.

In one or more examples, a GCM mode can be expressed as equation 1.

$$f(h|a_0, a_1, \ldots, a_{N-1}) = \sum_{K=0}^{N-1} a_k \cdot h^{N-k} \qquad \text{Equation 1}$$

In equation 1, the addition functions, multiplication functions, and exponential operations are defined in the Galois Field $GF(2^n)$, where n is an integer. For example, n is 128 or 256. In other examples, n is other integer values. The coefficients $\{a_k\}$ and the variable h are in $GF(2^n)$ that changes for every polynomial.

As will be described in greater detail in the following, each of the decimation circuitries 122 perform multiplications and addition operations in $GF(2^n)$. A multiplication and addition operation receives three inputs. e.g., b, c, and x, and outputs y=b·h+c. The variables b, c, h, and y are defined by $GF(2^n)$.

In one or more examples, the recursive circuitry 124 performs the functions of equation 2.

$$z = (((a_0h + a_1)h + a_2)h + a_3)h + \ldots + a_{N-1} \quad \text{Equation 2}$$

In equation 2, $a_0h+a_1$ can be defined as $z_1$, $(a_0h+a_1)h+a_2$ can be defined as $z_2$, $((a_0h+a_1)h+a_2)h+a_3$ can be defined as $z_3$, and $(((a_0h+a_1)h+a_2)h+a_3)h+\ldots+a_{N-1}$ can be defined as $z_{N-1}$.

In one or more examples during a recursive process, $z_1$ is determined based on $a_0h+a_1$, and $z_2$ is recursively determined based on $z_1 \cdot h+a_2$. Further, $z_3$ is recursively determined based on $z_2 \cdot h+a_3$, $z_4$ is recursively determined based on $z_3$ h+$a_4$, $z_k$ is recursively determined based on $z_{k-1} \cdot h+a_k$, and $z_{N-1}$ is recursively determined based on $z_{N-2} \cdot h+a_{N-1}$.

To recursively determine each of the values, the previous value has to be available before the current value can be determined. For example to determine $z_k$, $z_{k-1}$ is determined first. Accordingly, during such a process, the throughput is inversely proportional to the latency, and any pipelining stage in a multiplication circuitry reduces throughput of the corresponding authentication system. Conventionally, to increase the throughput, previous multiplication circuitries included p pipeline stages through the inclusion of p GCM processors. However, as each of the GCM processors has a recursive architecture, the throughput of such a system is still dependent on the latency. Further, in such a system, $h^q$ is determined before data is accepted by the processor, which adds processing overhead that increases the computation complexity and decreases the throughput.

As is described in further detail in the following, the authentication device 100 utilizes the decimation circuitries 122 to provide a pipelined multiplication function without negatively affecting the throughput of the authentication device 100.

In one example, each of the decimation circuitries 122 receives two data words of an input data stream. The data words are defined in $GF(2^n)$ having n bits. The two data words may be adjacent to each other. For example, a first data word may correspond $a_{k,2m}$ and a second data bit may correspond to $a_{k,2m+1}$. K corresponds to the decimation stage (e.g., decimation circuitry 122), and m corresponds the sequence number of the corresponding data input. In one example, the data words correspond to a sequence of bits within the input data stream. 2m and 2m+1 indicate the locations of the data words within the bit sequence. The output of a decimation circuitry 122 is defined by equation 3.

$$y_{k,m} = a_{k,2m} \cdot h^{2^{k-1}} + a_{k,2m+1} \quad \text{Equation 3}$$

As can be seen by equation 3, two data words of a sequence of a data packet are combined. Accordingly, the output $y_{k,m}$ of a decimation circuitry 122 is the combination of two or more data words of a corresponding sequence.

Figure 2:
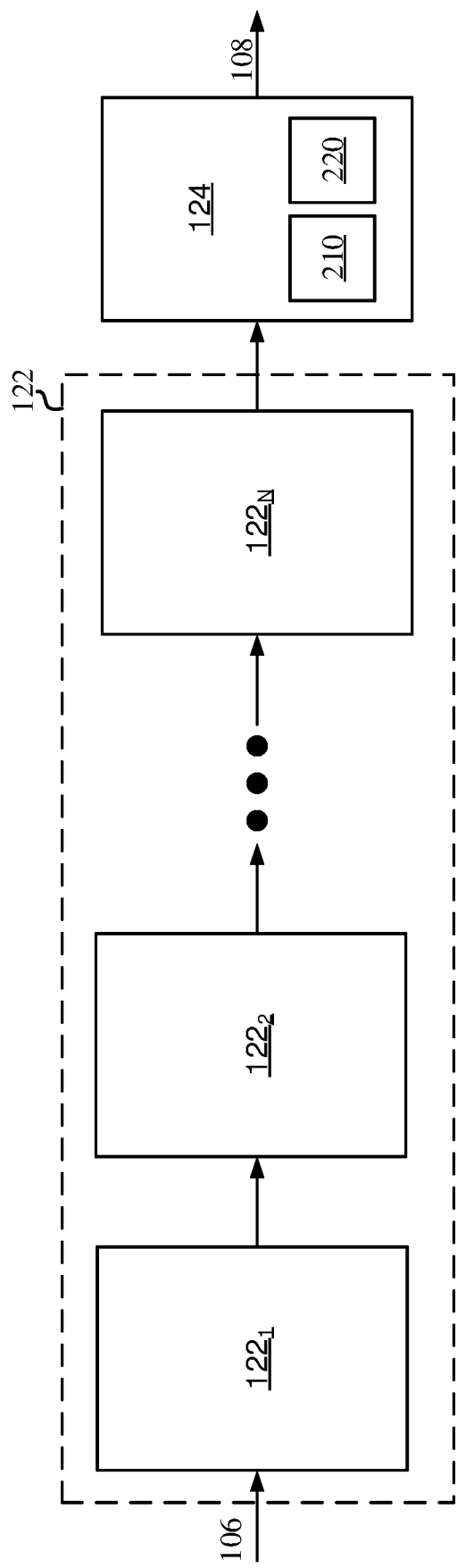
FIG. 2 is a block diagram of hash function circuitry.

FIG. 2 illustrates decimation circuitries 122 coupled to the recursive circuitry 124. The decimation circuitries 122 are serially concatenated to each other. For example, the output of the decimation circuitry $122_1$ is connected to the input of the decimation circuitry $122_2$. Further, the output of the decimation circuitry $122_{N-1}$ is connected to the input of the decimation circuitry $122_N$. The output of the decimation circuitry $122_N$ is connected to the input of the recursive circuitry 124. In one or more examples, the decimation circuitry $122_1$ receives an input data signal (e.g., the input signal 102 and/or the output data 104). The input data signal includes a sequence of data words, and the parameter h.

In one or more examples, a decimation circuitry 122 is described as a function that receives vector 1.

$$\{h_k, z_{k,0}, z_{k,1}, z_{k,2}, \ldots z_{k,N_k-1}\} \quad \text{Vector 1}$$

In one example, if $N_k$ is even, the decimation circuitry 122 determines equation 4 from the vector 1.

$$\{h_k^2, z_{k,0} \cdot h_k + z_{k,1}, z_{k,2} \cdot h_k + z_{k,3}, \ldots, z_{k,N_k-2} \cdot h_k + \cdot z_{k,N_k-1}\} \quad \text{Equation 4}$$

In Equation 4, for an even $N_k$, $h_k^2$ is determined as $h_{k+1}$, $z_{k,0} \cdot h_k + z_{k,1}$ is determined as $z_{k+1,0}$, $z_{k,2} \cdot h_k + z_{k,3}$ is determined as $z_{k+1,1}$, and $z_{k,N_k-2} \cdot h_k + z_{k,N_k-1}$ is determined as $$z_{k+1,\frac{N_k}{2}-1}.$$

If $N_k$ is not even, the decimation circuitry 122 determines equation 5 from the vector 1.

$$\{h_k^2, z_{k,0}, z_{k,1} \cdot h_k + z_{k,2}, z_{k,3} \cdot h_k + z_{k,4}, \ldots, z_{k,N_k-2} \cdot h_k + z_{k,N_k-1}\} \quad \text{Equation 5}$$

In Equation 5, $h_k^2$ is determined as $h_{k+1}$, $z_{k,0}$ is determined as $z_{k+1,0}$, $z_{k,1} \cdot h_k + z_{k,2}$ is determined as $z_{k+1,1}$, $z_{k,3} \cdot h_k + z_{k,4}$ is determined as $z_{k+1,2}$, and $z_{k,N_k-2} \cdot h_k + z_{k,N_k-1}$ is determined as $$z_{k+1,\frac{N_k-1}{2}}.$$

In view of equations 4 and 5, the multiplication operation is performed on each pair of even and odd inputs, and the corresponding output data rate (sample rate) is reduced by about half from the input. In one or more examples, when going from one decimation circuitry 122 to the next decimation circuitry 122, the multiplication coefficient h (or key) is squared (e.g., $h_{k+1}=h_k^2$). As is described in greater detail in the following, when $N_k$ is odd, the first input data $z_{k,0}$ is bypassed to the output and a multiplication operation is not performed. In one or more examples, the total number of multiplication operations per decimation circuitry 122 is $$\left[\frac{N_k}{2}\right]+1.$$

As is illustrated in FIG. 2, the decimation circuitries 122 are serially connected with each other, forming a cascaded chain of decimation stages. Each decimation circuitry 122 is one of the decimation stages. Cascading the decimation circuitries 122 allows for the equation 1 to be evaluated based on equation 6. Equation 6 corresponds to the output of a first decimation stage (e.g., the decimation circuitry $122_1$).

$$z = (a_0 \cdot h + a_1)h^{N-1} + (a_2 \cdot h + a_3)h^{N-3} + \ldots (a_{N-1} \cdot h + 0) \quad \text{Equation 6}$$

In equation 6, $(a_0 \cdot h + a_1)$ represents $z_{1,0}$, $(a_2 \cdot h + a_3)$ represents $z_{1,1}$, and $(a_{N-1} \cdot h + 0)$ represents $z_{1,n/2-1}$. In equation 6, $z_{1,0}$, $z_{1,1}$, and $z_{1,n/2-1}$ each corresponds to a combination of two data words of a data bit sequence of a data packet. The data words may be adjacent data words within the data bit sequence. For example, $z_{1,0}$ is determined from data words $a_0$ and $a_1$, $z_{1,1}$ is determined from data words $a_2$ and $a_3$, and $z_{1,n/2-1}$ is determined from $a_{n-1}$ and 0. Accordingly, the output z of equation 6 has half of the data rate (sample rate) as the input data stream.

For the output of a following decimation stage, e.g., the decimation circuitry $122_2$, is defined by equation 7.

$$z = (z_{1,0} \cdot h^2 + z_{1,1})h^{N-3} + \quad \text{Equation 7}$$
$$(z_{1,2} \cdot h^2 + z_{1,3})h^{N-7} + \ldots \left(z_{\frac{N}{2}-2} \cdot h^2 + z_{\frac{N}{2}-1}\right)$$

In equation 7, $(z_{1,0} \cdot h^2 + z_{1,1})$ represents $z_{2,0}$, $(z_{1,2} \cdot h^2 + z_{1,3})$ represents $z_{2,1}$, and $$\left(z_{\frac{N}{2}-2} \cdot h^2 + z_{\frac{N}{2}-1}\right)$$

represents $z_{2,N/4-1}$. In one example, the output of equation 7 is the output of the decimation circuitry $122_2$. In equation 7, each of $z_{2,0}$, $z_{2,1}$, and $z_{2,N/4-1}$ correspond to a combination of two adjacent z data points of equation 6. For example, $z_{2,0}$ is determined from a combination of z data words $z_{1,0}$ and $z_{1,1}$, $z_{2,1}$ is determined from a combination of z data words $z_{1,2}$ and $z_{1,3}$, and $z_{2,N/4-1}$ is determined from a combination of z data words $z_{N/2-2}$ and $z_{N/2-1}$. Accordingly, the output z of equation 7 has half the data rate as that of the output of z of equation 6.

As can be seen from equations 6 and 7, the output z of each decimation stage (e.g., each decimation circuitry 122) has a data throughput that is one half of the corresponding input (e.g., an input data sequence, or the output of a previous decimation circuitry 122).

The combined output of all of the decimation circuitries 122 is represented in equation 8.

$$z = \sum_{p=0}^{\frac{N}{2^K}-1} z_{K,p} \cdot \left(h^{2^K}\right)^{\frac{N}{2^{K-1-p}}} \quad \text{Equation 8}$$

In equations 6, 7, and 8, the number of data words in a data sequence (e.g., N) is an integral power of 2 (e.g., number of data words even). In an example where N, e.g., the number of data words, is not an integral power of 2 (e.g., number of data words is odd), zero padding (e.g., zeros are added) is applied to the input of the corresponding decimation circuitry 122 to ensure that N is an integral power of 2. In an example where zero padding is used, the corresponding decimation circuitry 122 outputs $z_{k+1,0} = z_{k,0}$.

In one example, at the decimation circuitry $122k$, the number of data words in the input sequence is $$N_k = \left\lceil \frac{N+1}{2^{k-1}} \right\rceil.$$

If the number of data words in the input sequence is odd, the first data bit input to a corresponding decimation circuitry 122 is bypassed as an output. Accordingly, the number of multiplication functions performed by corresponding decimation circuitry 122 is determined by equation 9.

$$\left\lfloor \frac{N_k}{2} \right\rfloor + 1 \leq \frac{N+1}{2^k} + 1 \quad \text{Equation 9}$$

For K stages of decimation (e.g., for K decimation circuitries 122), the total number of multiplication functions performed is determined from equation 10.

$$K + \frac{N+1}{2} + \frac{N+1}{4} + \ldots + \frac{N+1}{2^K} \quad \text{Equation 10}$$

In one example, the recursive circuitry 124 performs a number of multiplication functions as defined by equation 1.

Figure 3:
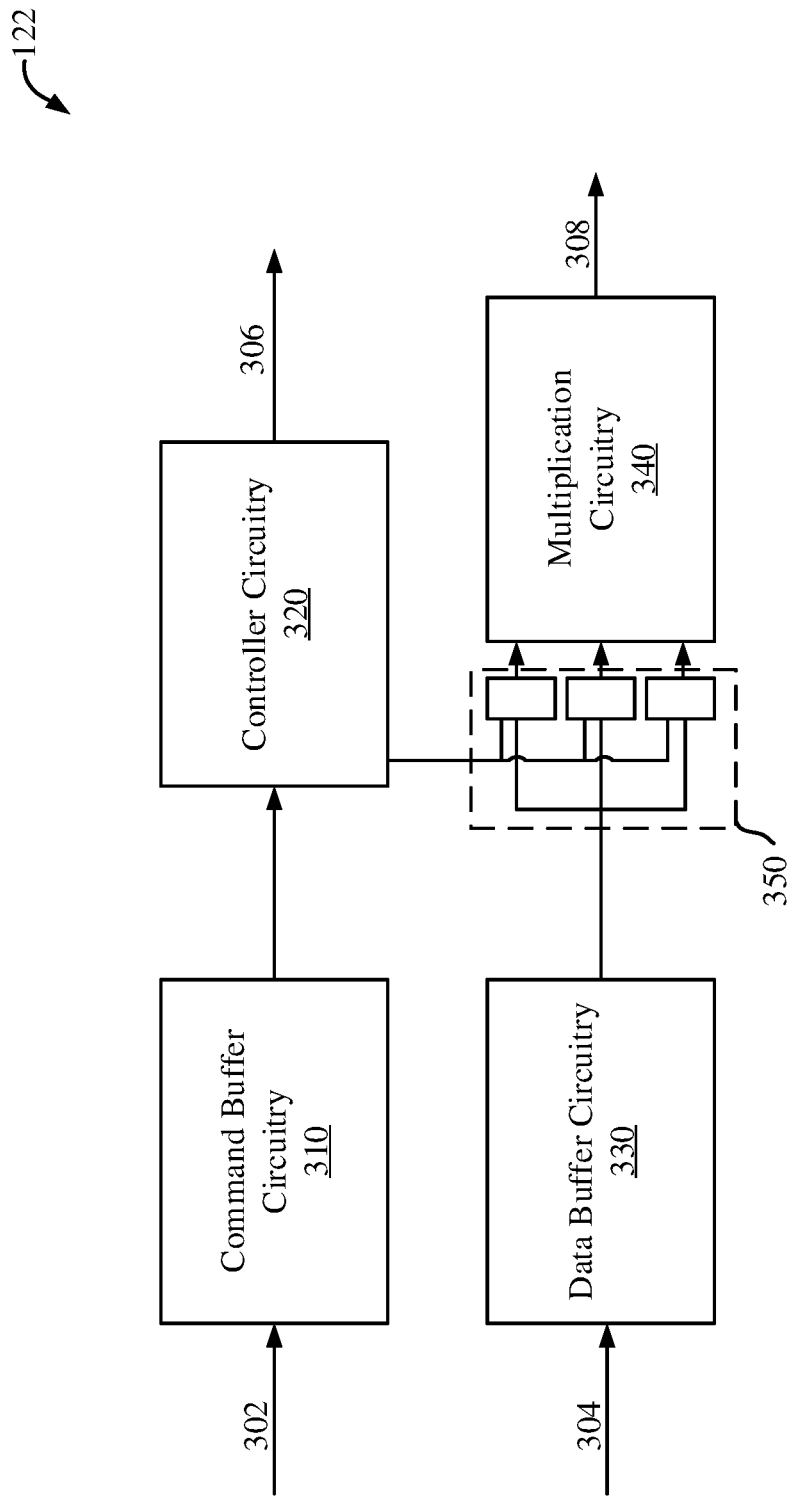
FIG. 3 is block diagram of a decimation circuitry.

FIG. 3 illustrates an example schematic block diagram of a decimation circuitry 122, according to one or more examples. As illustrated in FIG. 3, the decimation circuitry 122 includes command buffer circuitry 310, controller circuitry 320, data buffer circuitry 330, multiplication circuitry 340, and selection circuitry 350. The command buffer circuitry 310 is connected to the controller circuitry 320. The controller circuitry 320 is connected to the multiplication circuitry 340 via the selection circuitry 350. Further, the data buffer circuitry 330 is connected to the multiplication circuitry 340 via the selection circuitry 350. In one example, the decimation circuitry 122 receives the input signal 302 and 304, and outputs the output signals 306 and 308. In one example, the output signals 306 and 308 are the input signals to a following decimation circuitry 122. Further, the input signals 302 and 304 are the output signals 306 and 308 of a preceding decimation circuitry 122.

The command buffer circuitry 310 is a memory element, e.g., a buffer or other type of memory element. In one example, the command buffer circuitry 310 is a first-in-first-out (FIFO) buffer. In other examples, other types of buffers may be used.

The command buffer circuitry 310 receives the input signal 302. The input signal 302 includes information corresponding the input signal 304. For example, the input signal 302 includes the number of data words within the data stream (e.g., length of the data stream) of the input signal 304. In one example, the input signal 302 includes an indication as to whether or not the number data words within the data stream of the input signal 304 is even or odd.

The command buffer circuitry 310 outputs the length of the data stream, and any other information regarding the input signal 304 to the controller circuitry 320.

The data buffer circuitry 330 is a memory element, e.g., a buffer or other type of memory element. In one example, the data buffer circuitry 330 is a FIFO buffer. In other examples, other types of buffers may be used.

The data buffer circuitry 330 receives the input signal 304. The input signal 304 includes a data stream including a plurality of data words and value for the coefficient "h". The number of data words may be odd or even. The data buffer circuitry 330 stores the input signal 304 and outputs the data words of the data stream of the input signal 304 to the multiplication circuitry 340 via the selection circuitry 350. In one example, the data buffer circuitry 330 outputs the data words of the data stream one or more words at time and the coefficient "h".

The controller circuitry 320 receives the input signal 302 including the length of the data stream from the command buffer circuitry 310, and generates the output signal 306. Further, the controller circuitry 320 generates the control signal or signals 306 used to control the selection circuitry 350. The controller circuitry 320 uses the length information to identify the header information within the input data stream.

In one example, the controller circuitry 320 determines the length of the data stream of the output signal 308 based on the input signal 302, and outputs the length of the data stream within the output signal (e.g., output command signal) 306. The controller circuitry 320 determines the length of the data stream of the output signal 308 based on the change in throughput by the decimation circuitry 122. In one example, the change in throughput is 1/M, where M is greater than 1. In one example, M is 2. In such an example, the length of the data stream of the output signal 308 is the length of the data stream of the input signal 302 multiplied by 1/M.

The controller circuitry 320 further determines whether the number of bits within the data stream of the input signal 304 is even or odd. In an example where the number of data words within the data stream of the input signal 304 is odd, the controller circuitry 320 adds one or more zeros (e.g., performs zero padding) to the data stream of the input signal 304, such that the data stream of the input signal 304 has an even number of data words.

The selection circuitry 350 selects two data words from the data stream of the input signal 304 and outputs the selected data words along with the coefficient "h" to the multiplication circuitry 340. The selected data words are adjacent data words within the data stream of the input signal 304. Pairs of adjacent data words are selected until all of the data words within the data stream of the input signal 304 are selected and output to the multiplication circuitry 340 for processing. The multiplication circuitry 340 generates the output signal 308 by combining adjacent data words as described above with regard to equations 6, 7, and 8 as described above to generate the output signal 308 having a data stream with a reduced throughput as compared to the data stream within the input signal 304. The throughput of the output data stream is 1/M that of the input data stream.

With further reference to FIG. 2, the recursive circuitry 124 includes one or more multiplication circuitries 210 and one or more addition circuitries 220. The pipelined multiplication circuitries 210 may be fully pipelined. The multiplication circuitries 210 and addition circuitries 220 are used to perform a recursive process as defined by equation 2 based on the output signal 308 of the decimation circuitry $122_N$ to combine the outputs of the decimation circuitries 122 to generate and output the authentication tag 108. The recursive circuitry 124 receives multiple output data signals from the decimation circuitry $122_N$ over various periods, and combines the data signals. In one example, the decimation circuitries 122 generate multiple output data signals, each corresponding to a respective input data stream. The multiple output data signals are combined, in a pipeline fashion by the recursive circuitry 124 to generate the authentication tag 108.

For the decimation circuitries $122_1$-$122_{N-1}$, the output signals 306 and 308 are output to a subsequent decimation circuitry 122. For the decimation circuitry $122_N$, the output signals 306 and 308 are provided to the recursive circuitry 124.

In one example, for the decimation circuitries $122_2$-$122_N$, the coefficient "h" is squared to generate $h^2$. In one example, the multiplication circuitries 340 of the decimation circuitry $122_2$ determines $h^2$ and outputs $h^2$ as part of the output signal 308.

In one example, the decimation circuitries 122 are able to receive multiple data streams (e.g., packets) in a pipelined fashion. For example, after the decimation circuitry $122_1$ generates and outputs the output signals 306 and 308 from a first data stream (e.g., first packet), the decimation circuitry $122_1$ receives and processes a following subsequent data stream. Accordingly, multiple data streams may be processed by the decimation circuitry 122 and recursive circuitry 124 in a pipelined fashion (e.g., during overlapping periods of time), with different data streams being processed by different decimation circuitries 122 and/or the recursive circuitry 124 at different times. In one example, the decimation circuitry $122_2$ processes a corresponding data stream during a period overlapping with the decimation circuitry $122_1$ processing another corresponding data stream.

Figure 4:
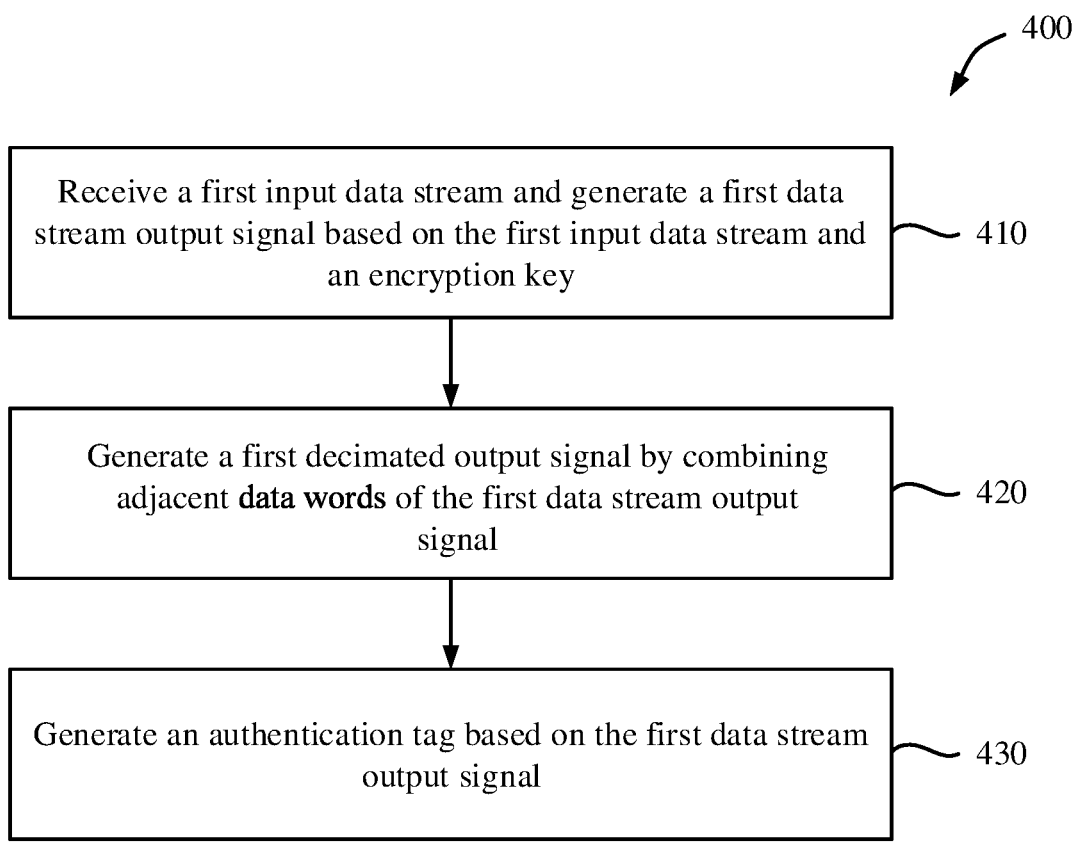
FIG. 4 is a flowchart of a method for generating an authentication tag.

FIG. 4 illustrates a flowchart of a method 400 for generating an authentication tag, according to one or more examples. The method 400 is performed by the authentication device 100 of FIG. 1. At 410 of the method 400, a first input data stream is received and a first data stream output is generated based on the first input data stream and an encryption key. With reference to FIG. 1, the, key stream generator circuitry 110 receives the first data stream signal (e.g., the input data 102) and generates first data stream output signal (e.g., the output data 104) by combining the first data stream signal with an encryption key.

At 420 of the method 400, a first decimated output signal is generated by combing adjacent data words of the first data stream output signal. For example, with reference to FIG. 3, the decimation circuitry 122 combines adjacent data words of a data stream within the input signal 304 to generate the output signal 308. In one example, multiplication circuitry 340 of the decimation circuitry 122 combines adjacent data words of the data stream within the input signal 304 with the coefficient h, or $h^2$, as is described above with regard to equations 6-8 to generate the output signal 308. The data rate of the output signal 308 is less than (e.g., 1/M) the data rate of the data stream of the input input data 102.

In one example, the controller circuitry 320 of the decimation circuitry 122 generates an output signal 306 that indicates the number of data words within the data stream of the output signal 308. The number of data words is generated based on the number of data words within the data stream of the input signal 304, and the data rate of the output signal 308.

At 430 of the method 400, an authentication tag is generated based on the first data stream output signal. With reference to FIG. 2, the recursive circuitry 124 generates the authentication tag and outputs the authentication tag (e.g., tag data) 108 based on the output of the decimation circuitry $122_N$ (e.g., the last decimation circuitry $122_N$).

While the foregoing is directed to specific examples, other and further examples may be devised without departing from the basic scope thereof, and the scope thereof is determined by the claims that follow.

What is claimed is:

1. An authentication device comprising:
   key stream generator circuitry configured to receive a first input data stream and generate a first data stream output signal based on the first input data stream and an encryption key, wherein the first input data stream is associated with a first data rate; and
   hash function circuitry configured to receive the first data stream output signal from the key stream generator circuitry, the hash function circuitry comprising:
      first decimation circuitry configured to receive the first data stream output signal, and combine adjacent data words of the first data stream output signal to generate a first decimated output signal having a second data rate, wherein the second data rate is less than the first data rate; and
      second decimation circuitry configured to receive the first decimated output signal and generate a second decimated output signal based on the first decimated output signal, wherein the second decimated output signal has a third data rate that is less than the second data rate; and
      recursive circuitry configured to generate an authentication tag based on the second decimated output signal.

2. The authentication device claim 1, wherein the first decimation circuitry is further configured to receive a second data stream output signal during a period overlapping within the second decimation circuitry combining the adjacent data words of the first decimated output signal.

3. The authentication device of claim 1, wherein the first decimation circuitry comprises:
   controller circuitry configured to determine a number of bits in the first decimated output signal based on the second data rate, and output a first control output signal including the number of bits in the first decimated output signal.

4. The authentication device of claim 3, wherein the controller circuitry is further configured to determine that a number of data words in the first data stream output signal is odd, and add one or more zeros to the first data stream output signal.

5. The authentication device of claim 3, wherein the first decimation circuitry further comprises:
   multiplication circuitry configured to receive pairs of adjacent data words of the first data stream output signal, and combine the pairs of adjacent data words of the first input data stream to generate the first decimated output signal.

6. The authentication device of claim 5, wherein the first decimation circuitry further receives a coefficient, and wherein combining the pairs of adjacent data words of the first input data stream comprises multiplying one or more of the adjacent data words with the coefficient.

7. A hash function circuitry comprising:
   first decimation circuitry configured to receive a first data stream output signal, and combine adjacent data words of the first data stream output signal to generate a first decimated output signal having a first data rate, wherein the first data stream output signal is generated from a first input data stream and an encryption key, the first input data stream comprising a second data rate that is greater than the first data rate;
   second decimation circuitry configured to receive the first decimated output signal and generate a second decimated output signal based on the first decimated output signal, wherein the second decimated output signal has a third data rate that is less than the second data rate; and
   recursive circuitry configured to generate an authentication tag based on the first decimated output signal.

8. The hash function circuitry of claim 7, wherein the first decimation circuitry is further configured to receive a second data stream output signal during a period overlapping within the second decimation circuitry combining the adjacent data words of the first decimated output signal.

9. The hash function circuitry of claim 7, wherein the first decimation circuitry comprises:
   controller circuitry configured to determine a number of data words in the first decimated output signal based on the second data rate, and output a first control output signal including the number of data words in the first decimated output signal.

10. The hash function circuitry of claim 9, wherein the controller circuitry is further configured to determine that a number of data words in the first data stream output signal is odd, and add one or more zeros to the first data stream output signal.

11. The hash function circuitry of claim 9, wherein the first decimation circuitry further comprises:
    multiplication circuitry configured to receive pairs of adjacent data words of the first data stream output signal, and combine the pairs of adjacent data words of the first input data stream to generate the first decimated output signal.

12. The hash function circuitry of claim 11, wherein the first decimation circuitry further receives a coefficient, and wherein combining the pairs of adjacent data words of the first input data stream comprises multiplying one or more of the adjacent data words with the coefficient.

13. A method comprising:
    receiving a first input data stream and generating a first data stream output signal based on the first input data stream and an encryption key, wherein the first input data stream is associated with a first data rate;
    generating, via first decimation circuitry of hash function circuitry, a first decimated output signal by combining adjacent data words of the first data stream output signal, the first decimated output signal having a second data rate, wherein the second data rate is less than the first data rate;
    receiving, via second decimation circuitry of the hash function circuitry, the first decimated output signal, and combining adjacent data words of the first decimated output signal to generate a second decimated output signal having a third data rate, wherein the third data rate is less than the second data rate; and
    generating, via recursive circuitry of the hash function circuitry, an authentication tag based on the second decimated output signal.

14. The method of claim 13 further comprising:
    receiving, via the first decimation circuitry, a second data stream output signal during a period overlapping within combining, via the second decimation circuitry, the adjacent data words of the first decimated output signal.

15. The method of claim 13 further comprising:
    determining, via controller circuitry of the first decimation circuitry, a number of data words in the first decimated output signal based on the second data rate; and outputting a first control output signal including the number of data words in the first decimated output signal.

16. The method of claim 15 further comprising:
determining, via the controller circuitry, that a number of data words in the first data stream output signal is odd, and adding one or more zeros to the first data stream output signal.

17. The method of claim 16 further comprising:
combining, via multiplication circuitry of the first decimation circuitry, the adjacent data words of the first input data stream with a coefficient to generate the first decimated output signal.

\* \* \* \* \*